Figure 1:
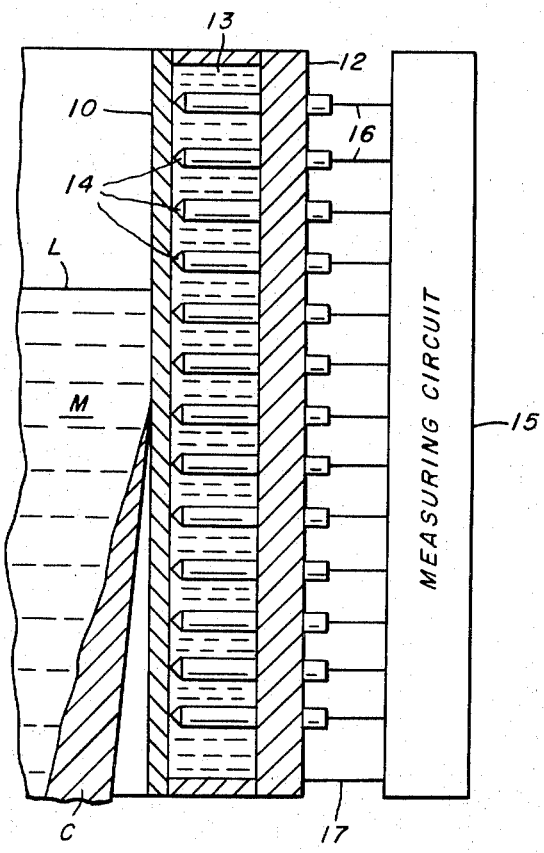

United States Patent
Babcock et al.

[11] 3,797,310
[45] Mar. 19, 1974

[54] TEMPERATURE SENSING DEVICE

[75] Inventors: Clarence E. Babcock, Penn Hills Township, Allegheny County; James H. Wilson, Franklin Township, Westmoreland County, both of Pa.

[73] Assignee: United States Steel Corporation, Pittsburgh, Pa.

[22] Filed: Feb. 28, 1972

[21] Appl. No.: 230,048

Related U.S. Application Data
[63] Continuation of Ser. No. 88,780, Nov. 12, 1970, abandoned.

[52] U.S. Cl. ............... 73/295, 73/359, 164/154
[51] Int. Cl. ............... G01f 23/22, G01k 7/08
[58] Field of Search ...... 73/295, 359; 164/154, 155, 164/4

[56] References Cited
UNITED STATES PATENTS

| | | | |
|---|---|---|---|
| 2,450,871 | 10/1948 | Adair | 73/359 |
| 3,456,715 | 7/1969 | Freedman | 164/4 |
| 3,266,891 | 8/1966 | Finch | 136/241 |
| 2,279,043 | 4/1942 | Harrington | 73/295 |
| 3,399,568 | 9/1968 | Wilson | 73/359 |
| 3,204,460 | 9/1965 | Milnes | 73/295 |

*Primary Examiner*—Richard C. Queisser
*Assistant Examiner*—Denis E. Corr
*Attorney, Agent, or Firm*—Walter P. Wood

[57] ABSTRACT

An improved temperature-sensing device for use in a mechanism which locates the level of a hot liquid in a metallic vessel. The device is intended especially for use in a water-cooled continuous-casting mold, where it is known to place a row of vertically spaced thermocouples in the mold and connect them to a measuring circuit. The circuit indicates a temperature profile in which an abrupt temperature change shows the location of the liquid level. The present invention replaces the conventional thermocouples used previously with simple probes which have single point contact with the vessel. The probes and vessel wall are of different metals, whereby they form thermocouples, but these thermocouples measure only relative temperature differences rather than true temperatures.

5 Claims, 2 Drawing Figures

PATENTED MAR 19 1974 3,797,310

TEMPERATURE SENSING DEVICE

This application is a continuation of Ser. No. 88,780 filed Nov. 12, 1970, now abandoned.

This invention relates to an improved temperature-sensing device to be used in a mechanism which indicates the level of a hot liquid in a metallic vessel.

Although our invention is not thus limited, our sensing device is particularly useful when embodied in a mechanism which indicates the level of liquid metal in a water-cooled continuous-casting mold, as shown for example in Milnes U.S. Pat. No. 3,204,460. The Milnes mechanism includes a row of vertically spaced thermocouples mounted in the mold wall and a measuring circuit to which the thermocouples are connected for indicating the temperature at each and thus showing the temperature profile along the height of the mold. The mold wall is cooler above the level of liquid therein than immediately below. Hence the height at which the profile shows an abrupt change in the mold wall temperature represents the level of liquid in the mold. Desireably this level is maintained constant. An indication of the location of this level enables proper control to be exercised.

The Milnes mechanism utilizes conventional thermocouples which furnish accurate temperature measurements, but which are awkward to install in a water-cooled mold. To prevent erroneous temperature indications, their junctions must be insulated from external cooling, and the lead wires from the junctions must be completely electrically insulated.

An object of our invention is to provide an improved temperature-sensing device which can replace a conventional thermocouple in a mechanism for indicating a temperature profile and avoids the need for elaborate insulation.

A further object is to provide an improved temperature-sensing device, a plurality of which can be connected to a suitable measuring circuit for indicating the location of an abrupt temperature change without actually measuring true temperatures.

Figure 2:
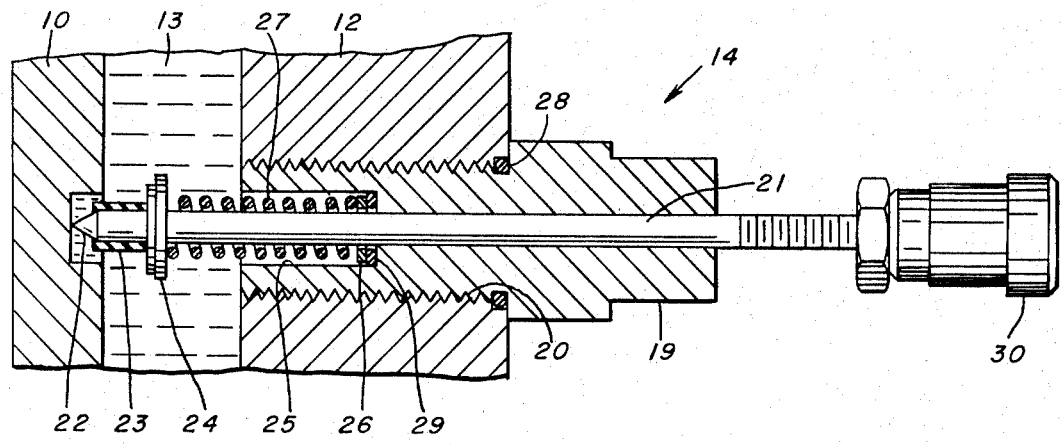

In the drawing:

FIG. 1 is a diagrammatic vertical sectional view of a continuous-casting mold equipped with temperature-sensing devices constructed in accordance with our invention; and FIG. 2 is a sectional view on a larger scale of a portion of the mold showing a preferred actual construction of our device.

The drawing shows a portion of a conventional continuous-casting mold which includes spaced-apart inner and outer walls 10 and 12. The inner wall 10 is of a metal which has high thermal conductivity, usually copper. The outer wall 12 usually is steel. The inner wall contains liquid metal M which rises to a level L and which partially solidifies in the lower portion, as indicated at C. The space between walls 10 and 12 forms a passage 13 through which water circulates to cool the inner wall and assist in solidifying the casting, as known in the art. The mold is equipped with a row of vertically spaced temperature-sensing devices 14 constructed in accordance with our invention and hereinafter described. A measuring circuit 15 is electrically connected to these devices through leads 16 and to the mold through a lead 17. The circuit is shown only in block diagram, since it may be the same as shown in detail in the Milnes patent.

FIG. 2 shows details of one of our temperature-sensing devices 14. Preferably the others are similar. The device includes a tubular housing 19 mounted in a tapped opening 20 in the outer wall 12. The housing is of a suitable insulating material such as "Teflon." An elongated probe 21 extends through the bore of the housing. The inner end of the probe has a point 22 which contacts the surface of the inner wall 10. We may place an insulating sleeve 23 around the probe in the vicinity of the inner wall to prevent any more than single point contact between the probe and inner wall. The probe is of a metal dissimilar to the metal of the inner wall. For example, if the inner wall is cooper, the probe may be of the nickel-copper alloy constantan. Other examples of metals suitable for use with a copper inner wall are iron, steel, alloys such as "Alumel," and platinum. The only requirement is that the two metals (wall and probe) form a thermocouple capable of transmitting a measurable voltage signal at the temperature encountered. Conveniently the probe has a diameter of about ⅛ inch to furnish the necessary mechanical strength, yet not unduly obstruct the water passage 13.

The probe carries a flange 24 located intermediate its length within the water passage 13. The housing 19 has a counterbore 25 within which we insert a washer 26. A compression spring 27 encircles the probe and bears at its ends against flange 24 and washer 26 to hold the point 22 in contact with the inner wall 10 as the parts undergo thermal expansion and contraction. We insert O-ring seals 28 and 29 between the outer wall 12 and the housing 19, and between the outer wall and washer 26 respectively to prevent water leakage. The outer end of probe 21 is threaded and carries a terminal 30 to which we connect the lead 16.

In operation, we install a row of our temperature-sensing devices 14 at vertically spaced locations in the wall of a continuous-casting mold or other metallic vessel which contains liquid at a high temperature, as shown in FIG. 1. The junction between each point 22 and the inner wall 10 forms a respective thermocouple which transmits to circuit 15 a voltage signal proportional to the wall temperature at that location. At the level L there is an abrupt temperature increase in the downward direction. The circuit indicates the temperature profile along the height of the mold and thus shows the location of the level L.

As distinguished from the Milnes patent, we need not measure the true temperature of the wall at any of our thermocouples. We need only measure relative temperature differences. When we apply our temperature-sensing device to a water-cooled mold as illustrated, the water not only has a cooling effect on the thermocouples, but it shunts part of the voltage signal from each. Both these factors prevent our obtaining true temperature measurements. Nevertheless, the errors are reasonably uniform throughout the mold height, whereby we obtain an accurate indication of the liquid level. The impedance of the measuring circuit 15 is lower than that of the water in passage 13 so that a signal of sufficient magnitude reaches the circuit.

We claim:

1. In a combination which includes a continuous-casting mold adapted to contain liquid metal and a mechanism for indicating the level of the liquid metal therein;

said mold including spaced apart inner and outer walls, said inner wall containing the liquid metal and being itself of a metal which has a high thermal conductivity, the space between said walls forming a passage through which water circulates to cool said inner wall;

said mechanism including a row of vertically spaced temperature sensing devices on said mold and a measuring circuit connected to said devices for indicating the level at which there is an abrupt change in the temperature of said inner wall;

the improvement in which each of said devices comprises:

a respective probe having a point at one end and being of a metal dissimilar to the metal of said inner wall; and means mounting said probe in said outer wall and insulating said probe therefrom, said probe extending across said passage to said inner wall and being exposed to water circulating through the passage;

said mounting means including a housing fixed in said outer wall and having a bore receiving said probe, a spring acting against said housing and said probe urging said probe into contact with said inner wall, whereby said point remains in contact with said inner wall as the parts undergo thermal expansion and contraction and forms therewith a thermocouple transmitting a voltage signal to said measuring circuit, and seals between said housing and said outer wall and between said probe and said housing.

2. An improvement as defined in claim 1 in which said housing is of insulating material and provides the insulation between said probe and said outer wall.

3. An improvement as defined in claim 1 in which said sensing devices measure only relative temperature changes along the height of said mold and are prevented from measuring true temperatures by the cooling and shunting effect of water in said passage.

4. An improvement as defined in claim 1 in which said inner wall is copper and said probe is a nickel-copper alloy.

5. An improvement as defined in claim 1 further comprising insulating means on said probe preventing any but single point contact with said inner wall.

* * * * *